(12) United States Patent
Kroon et al.

(10) Patent No.: US 11,218,681 B2
(45) Date of Patent: Jan. 4, 2022

(54) APPARATUS AND METHOD FOR GENERATING AN IMAGE

(71) Applicant: KONINKLIJKE PHILIPS N.V., Eindhoven (NL)

(72) Inventors: Bart Kroon, Eindhoven (NL); Wiebe De Haan, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/624,336

(22) PCT Filed: Jun. 27, 2018

(86) PCT No.: PCT/EP2018/067229
§ 371 (c)(1),
(2) Date: Dec. 19, 2019

(87) PCT Pub. No.: WO2019/002357
PCT Pub. Date: Jan. 3, 2019

(65) Prior Publication Data
US 2020/0134910 A1  Apr. 30, 2020

(30) Foreign Application Priority Data
Jun. 29, 2017 (EP) ..................... 17178661

(51) Int. Cl.
*H04N 13/117* (2018.01)
*H04N 13/344* (2018.01)
(Continued)

(52) U.S. Cl.
CPC ........... *H04N 13/117* (2018.05); *G06T 15/20* (2013.01); *H04N 13/111* (2018.05);
(Continued)

(58) Field of Classification Search
CPC .......................... H04N 13/117; H04N 13/122
See application file for complete search history.

(56) References Cited

U.S. PATENT DOCUMENTS 7,692,640 B2   4/2010   Van Geest et al.
9,256,926 B2   2/2016   Berretty et al.
(Continued)

FOREIGN PATENT DOCUMENTS

WO   2017080420 A1   5/2017

OTHER PUBLICATIONS

T. Kanade & M. Okutomi, "A Stereo Matching Algorithm with an Adaptive Window: Theory and Experiment", 16 IEEE Transactions on Pattern Analysis and Machine Intelligence 920-932 (Sep. 1994) (Year: 1994).*

(Continued)

*Primary Examiner* — David N Werner

(57) ABSTRACT

An apparatus for generating an image comprises a receiver (101) which receives 3D image data providing an incomplete representation of a scene. A receiver (107) receives a target view vector indicative of a target viewpoint in the scene for the image and a reference source (109) provides a reference view vector indicative of a reference viewpoint for the scene. A modifier (111) generates a rendering view vector indicative of a rendering viewpoint as a function of the target viewpoint and the reference viewpoint for the scene. An image generator (105) generates the image in response to the rendering view vector and the 3D image data.

20 Claims, 10 Drawing Sheets

(51) Int. Cl.
  *H04N 13/366* (2018.01)
  *G06T 15/20* (2011.01)
  *H04N 13/122* (2018.01)
  *H04N 13/111* (2018.01)
  *H04N 13/128* (2018.01)

(52) U.S. Cl.
  CPC ......... *H04N 13/122* (2018.05); *H04N 13/128* (2018.05); *H04N 13/344* (2018.05); *H04N 13/366* (2018.05)

(56) References Cited

U.S. PATENT DOCUMENTS

| | | | |
|---|---|---|---|
| 9,485,487 B2 | 11/2016 | Kroon | |
| 2010/0053310 A1 | 3/2010 | Maxson et al. | |
| 2011/0261050 A1* | 10/2011 | Smolic | H04N 19/597 345/419 |
| 2011/0292044 A1* | 12/2011 | Kim | H04N 13/122 345/419 |
| 2012/0062548 A1* | 3/2012 | Pan | G09G 3/003 345/419 |
| 2012/0086775 A1* | 4/2012 | Bae | H04N 13/261 348/46 |
| 2012/0133735 A1* | 5/2012 | Boisson | H04N 13/161 348/43 |
| 2013/0038600 A1* | 2/2013 | Wang | H04N 13/189 345/419 |
| 2013/0076872 A1* | 3/2013 | Wang | H04N 13/144 348/51 |
| 2013/0106848 A1* | 5/2013 | Nguyen | G06T 15/205 345/419 |
| 2013/0187910 A1* | 7/2013 | Raymond | H04N 13/305 345/419 |
| 2013/0315472 A1* | 11/2013 | Hattori | H04N 19/44 382/154 |
| 2014/0002595 A1* | 1/2014 | Po | H04N 13/111 348/43 |
| 2014/0118509 A1 | 5/2014 | Kroon | |
| 2014/0132718 A1* | 5/2014 | Suh | H04N 21/816 348/43 |
| 2014/0347444 A1* | 11/2014 | Naske | H04N 13/122 348/46 |
| 2015/0172621 A1* | 6/2015 | Thebault | H04N 13/161 348/43 |
| 2015/0245062 A1* | 8/2015 | Shimizu | H04N 19/597 375/240.15 |
| 2017/0004648 A1* | 1/2017 | Li | G02B 27/017 |
| 2017/0302901 A1* | 10/2017 | Yang | G06T 7/20 |
| 2018/0211400 A1* | 7/2018 | Park | G06T 7/593 |
| 2019/0230280 A1* | 7/2019 | Kikukawa | H04N 13/111 |
| 2019/0304160 A1* | 10/2019 | Izumi | H04N 13/178 |

OTHER PUBLICATIONS

D. Scharstein & R. Szeliski, "Stereo Matching with Nonlinear Diffusion", 28 Int'l J. of Comp. Vision 155-174 (Jun. 1998) (Year: 1998).*

M.M. Hannuksela "OMAF: Composition of Multiple Tracks and Background" ISO/IEC JTC1/SC29/WG11 Apr. 2017.

Choi et al. "OMAF: Background and Region Indication" ISO/IEC JTC1/SC29/WG11 Jan. 2017.

Yip et al. "OMAF: Metadata Clean-up for OMAF WD" ISO/IEC JTC1/SC29/WG11 Oct. 2016.

* cited by examiner

APPARATUS AND METHOD FOR GENERATING AN IMAGE

CROSS-REFERENCE TO PRIOR APPLICATIONS

This application is the U.S. National Phase application under 35 U.S.C. § 371 of International Application No. PCT/EP2018/067229, filed on Jun. 27, 2018, which claims the benefit of EP Patent Application No. EP 17178661.9, filed on Jun. 29, 2017. These applications are hereby incorporated by reference herein.

FIELD OF THE INVENTION

The invention relates to an apparatus and method for generating an image from 3D image data providing an incomplete representation of a scene and in particular, but not exclusively, to generating an image for a virtual reality application.

BACKGROUND OF THE INVENTION

Traditionally, technical processing and use of images has been based on two-dimensional imaging but increasingly the third dimension is being explicitly considered in image processing.

For example, three dimensional (3D) displays have been developed which add a third dimension to the viewing experience by providing a viewer's two eyes with different views of the scene being watched. This can be achieved by having the user wear glasses to separate two views that are displayed. However, as this may be considered inconvenient to the user, it is in many scenarios preferred to use autostereoscopic displays that use means at the display (such as lenticular lenses, or barriers) to separate views, and to send them in different directions where they individually may reach the user's eyes. For stereo displays, two views are required whereas autostereoscopic displays typically require more views (such as e.g. nine views).

In many embodiments, it may be desirable to generate view images for new viewing directions. Whereas various algorithms are known for generating such new view images based on image and depth information, they tend to be highly dependent on the accuracy of the provided (or derived) depth information.

Indeed, three dimensional image information is often provided by a plurality of images corresponding to different view directions for a scene. Specifically, video content, such as films or television programs, are increasingly generated to include some 3D information. Such information can be captured using dedicated 3D cameras that capture two simultaneous images from slightly offset camera positions.

However, in many applications, the provided images may not directly correspond to the desired directions, or more images may be required. For example, for autostereoscopic displays, more than two images are required, and indeed often 9-26 view images are used.

In order to generate images corresponding to different view directions, view point shifting processing may be employed. This is typically performed by a view shifting algorithm which uses an image for a single view direction together with associated depth information.

A particular example of an application that is based on three dimensional image processing, is a virtual reality application. In typical virtual reality experiences, right eye and left eye view images may continuously be generated for e.g. a virtual reality headset to match the movement and change of orientation by the user. Such generation of dynamic virtual reality views is typically based on processing of 3D image data representing a given scene corresponding to the virtual reality environment. For example, a virtual reality server may generate view images for specific views based on a three dimensional model or three dimensional images, such as images represented by light intensity images and depth maps, or texture maps and depth meshes.

For applications such as virtual reality applications, a sequence of images may e.g. be generated to reflect a user's views as these change due to the user virtually moving or changing view direction/orientation in the virtual environment. In some applications, the images may be generated to reflect changes in the viewer's orientation but without supporting movement in the area. Video reflecting such a scenario is often referred to as omnidirectional video. In other applications, a moving viewing position may also be supported to reflect a user's virtual movement in the virtual reality environment. Video reflecting such a scenario is often referred to as immersive video. The current view of a user may be represented by a view vector which describes relevant positional and directional parameters for a viewpoint.

For omnidirectional video, a view vector typically describes an orientation according to three degrees of freedom (3DoF), typically by providing yaw, pitch and roll values.

For immersive video, a vector typically describes both an orientation and position according to six degrees of freedom (6DoF), typically by providing values for yaw, pitch, roll, and for three spatial dimensions.

However, a particular challenge when trying to develop and support flexible video and image applications supporting variable view positions and/or directions is that these are preferably not limited to a subset of positions and/or directions but all positions and/or directions are ideally supported. For example, for 6DoF immersive video, a viewer may be viewing the scene from any position and in any direction. This requires 3D information to be available for all parts of the scene and from all positions and for all directions. This requirement is difficult or impossible to meet in many practical applications, such as specifically applications wherein the 3D data is based on captures of a real world scene.

For example, for movies, directors take great care in hiding capturing crew and equipment from view. One approach is the so-called 180° film grammar rule where the cameras are positioned on one side of the scene, facing the other. Recording omnidirectional video is much harder because the entire scene around each omnidirectional camera is visible. This e.g. forces the crew to hide behind scenery and remove elements such as tripods in post processing.

Indeed, even for scenes where full coverage is relevant and potentially could be made available, there is often a preferred direction. Since it typically does not make sense for the viewer to turn around e.g. 180°, it is typically not practical to expend the resource required to record, store or transmit the image data corresponding to this viewpoint.

This however results in the problem that there is missing content and that the representation of the scene is incomplete. Accordingly, if the viewer were actually to turn around 180°, there would be no data available allowing an appropriate view to be generated, and consequently coverage will be limited. In such cases, the obvious approach would be to not render any image information where no data is provided by the 3D image representation, or alternatively e.g. a default texture could be presented. However, this will be perceptually very noticeable and disturbing to the user and will tend to break the immersive experience that is so crucial to e.g. virtual reality applications.

In order to avoid this issue, it is generally considered to be necessary to generate full three-dimensional computer graphics model which is dynamically evaluated and use to generate any view that may be required. However, this is often impractical, very complex, resource demanding, requires excessive capture and model conversion etc.

Hence, an improved approach for generating images from three-dimensional image data would be advantageous. In particular, an approach that allows improved operation, increased flexibility, facilitated implementation, facilitated operation, improved communication, reduced complexity, reduced resource demand, an improved immersive user experience, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for generating an image, the apparatus comprising: a receiver for receiving 3D image data for a scene, the 3D image data providing an incomplete representation of the scene; a receiver for receiving a target view vector indicative of a target viewpoint in the scene for the image; a reference source for providing a reference view vector indicative of a reference viewpoint for the scene, the reference view vector being determined in response to a border view vector indicative of a border between a part of the scene for which the 3D image data comprises image data and a part of the scene for which the 3D image data does not comprise image data; a modifier for generating a rendering view vector indicative of a rendering viewpoint as a function of the target viewpoint and the reference viewpoint for the scene, the modifier being arranged to bias the rendering view vector away from the part of the scene for which the 3D image data does not comprise any data for at least some values of the target view vector; and an image generator for generating the image in response to the rendering view vector and the 3D image data.

The invention may in many embodiments and scenarios allow improved images to be generated. In particular, an improved trade-off may be achieved between providing a desired view from a desired viewpoint and providing a high-quality image. The approach may for example provide a gentle bias of views towards preferred views where image quality may be higher. The approach may for example allow a virtual reality experience in which a user may control the viewpoints but with these being biased towards viewpoints that provide improved quality. For example, an effect can be provided where the user may freely control the viewpoint for the generated views as long as these views can be generated from the 3D image data. However, when directed towards viewpoints for which the 3D image data provides no data, the system may introduce a reluctance or bias against this movement. This may in many situations provide a subtle and often imperceptible adaptation that may result in modified user behavior.

The approach may in particular provide an advantageous generation of images for scenarios wherein the target view vector is generated and controlled in response to a user input. For example, the approach is highly suitable for providing view images for a virtual reality application (e.g. providing images for a virtual reality headset). The approach may allow a high degree of freedom while reducing the impact of only an incomplete representation of the scene being provided by the 3D image data.

Further, the approach may bias the user to control the virtual reality application away from viewpoints that tend to substantially reduce quality due to lack of data from the 3D image data.

The approach may in many embodiments and scenarios provide satisfactory generation of images without requiring complete representation of the underlying scene. The approach may reduce the inconvenience resulting from an incomplete representation of the scene and may accordingly allow the use of incomplete models or captures. In particular, the approach may typically provide improved support for applications based on capturing of a real-world scene, e.g. using 3D cameras.

The 3D image data may provide an incomplete representation of the scene.

A view vector may be any value or set of values indicating a viewpoint. A viewpoint may be a position and/or orientation for a view/viewport. A view vector may for example include one or more values indicating a position of a viewpoint and/or one or more values indicating a view orientation for a viewpoint.

The 3D image data may comprise any data that allows image content to be generated to represent a (visual/light intensity) view of the scene. For example, the 3D image data may comprise a 3D model of the scene allowing the system to generate views. In many embodiments, the 3D image data may comprise one or more 3D images with each 3D image providing light intensity and depth information, such as an image+depth or a texture map+mesh representation. In many embodiments, the 3D image data may comprise wide-view angle images, and specifically almost omnidirectional images may be included.

The 3D image data provides an incomplete representation of the scene and thus there is at least one part of the scene for which the 3D image data does not provide a description of the visual properties for at least one viewpoint. The part(s) of the scene which is not described by the 3D image data may be different for different viewpoints. For at least one view position, there is at least one view orientation for which at least part of the corresponding viewport for which the 3D image data does not include a(n individual) description of the visual properties. For such parts, the image content may typically be generated from 3D image data for other parts of the scene, specifically by extrapolation from a region (such as the first region) for which 3D image data provides image data to a region (the second region) for which the 3D image data does not provide image data.

Thus, typically for such parts of the scene, image content needs to be generated from other parts of the scene (typically using assumptions that tend to be relatively inaccurate, e.g. that no changes occur for image content belonging to the different regions).

The scene may be a specific representation of a specific part or view of an underlying 3D environment, such as e.g. a 3D representation of the view of the environment from a given position at a given time. At may in some cases be the entire underlying 3D environment, such as a 3D model of an environment or world. Thus, the scene may be considered to be any environment the image is generated to represent a view of.

The reference view vector/viewpoint may in some scenarios correspond to a preferred view vector/viewpoint or may in some embodiments correspond to a view vector/viewpoint that is undesired.

The 3D image data provides an incomplete representation of the scene and the reference source is arranged to determine the reference view vector in response to a border view vector indicative of a border between a part of the scene for which the 3D image data comprises image data and a part of the scene for which the 3D image data does not comprise image data.

This may provide particularly advantageous operation and/or performance in many scenarios It may for example in many embodiments introduce a bias away from areas of the scene for which the 3D image data does not comprise any data. In particular it may often provide a desirable bias towards views of higher quality without this unacceptably restricting freedom or breaking the feeling of immersion.

In accordance with an optional feature of the invention, the receiver for receiving 3D image data is arranged to receive a data stream comprising the 3D image data and further comprising nominal viewpoint data; and wherein the reference source is arranged to generate the reference view vector in response to the nominal viewpoint data. The reference view vector may be determined as a function of the nominal viewpoint. It will be appreciated that the function used will depend on the preferences, requirements, and effects desired for the individual embodiment. In many embodiments, the reference view vector may be determined to correspond to/be indicative of a nominal viewpoint indicated in the nominal viewpoint data.

This may provide particularly advantageous operation and/or performance in many scenarios It may for example in many embodiments introduce a bias away from areas of the scene for which the 3D image data does not comprise any data. In particular it may often provide a desirable bias towards views of higher quality without this unacceptably restricting freedom or breaking the feeling of immersion.

The approach may in particular allow a content provider to assist, guide, and/or control the biasing towards desired viewpoints. For example, a "directors" view may be provided as a recommended or suggested viewpoint.

In accordance with an optional feature of the invention, the apparatus comprises a receiver for receiving display property data; and the reference source is arranged to generate the reference view vector in response to the display property data.

This may provide particularly advantageous operation and/or performance in many scenarios. It may for example provide improved adaptation to a variety of displays and allow optimization for the specific display used. The display property data may specifically be an indication of a view angle provided by the displayed image.

In accordance with an optional feature of the invention, the modifier is further arranged to determine the rendering view vector in response to a proportion of a viewport for which the 3D image data comprises image data for a viewpoint corresponding to the rendering view vector.

This may provide particularly advantageous operation and/or performance in many scenarios.

In accordance with an optional feature of the invention, the 3D image data comprises 3D image data representing views from a set of viewpoints; and the modifier is further arranged to determine the rendering view vector in response to the set of viewpoints.

This may provide particularly advantageous operation and/or performance in many scenarios. It may in particular tend to provide improved operation and/or performance when the 3D image data represents capture of a real-world scene.

In accordance with an optional feature of the invention, the modifier is arranged to increase a distance from the rendering view vector to the target view vector for a decreasing distance from the target view vector to the reference view vector.

This may provide particularly advantageous operation and/or performance in many scenarios, and in particular when the reference view vector is indicative of a preferred viewpoint.

In some embodiments, the view vector source is arranged to increase a distance from the rendering view vector to the target view vector for a decreasing distance from the target view vector to the reference view vector.

This may provide particularly advantageous operation and/or performance in many scenarios, and in particular when the reference view vector is indicative of a non-preferred viewpoint.

In accordance with an optional feature of the invention, the modifier is arranged to decrease a ratio between a distance from the rendering view vector to the reference view vector and a distance from the rendering view vector to the target view vector for an increasing distance from the target view vector to the reference view vector.

This may provide particularly advantageous operation and/or performance in many scenarios, and in particular when the reference view vector is indicative of a preferred viewpoint.

In some embodiments, the view vector source is arranged to decrease a ratio between a distance from the rendering view vector to the reference view vector and a distance from the rendering view vector to the target view vector for a decreasing distance from the target view vector to the reference view vector.

This may provide particularly advantageous operation and/or performance in many scenarios, and in particular when the reference view vector is indicative of a non-preferred viewpoint.

In accordance with an optional feature of the invention, the modifier is arranged to determine the rendering view vector as substantially the target view vector for a difference between the target view vector and the reference view vector being below a threshold.

This may provide particularly advantageous operation and/or performance in many scenarios, and may in particular ensure that the effect is insignificant/imperceptible when it is not necessary to improve image quality.

In accordance with an optional feature of the invention, the image generator comprises: a renderer for rendering a first region of the image for the rendering view vector, the first region being a region for which the 3D image data comprises image data; an extrapolator for extrapolating the 3D image data into a second region of the image, the second region being a region for which the 3D image does not comprise image data and the first and second regions being adjoining regions.

The invention may in many embodiments and scenarios allow improved images to be generated. In particular, an improved perceived image quality may be achieved even when the generated image includes one or more areas for which the 3D image data does not provide any image data.

The extrapolator is typically arranged to extrapolate the 3D image data into a second region by extrapolating image content (specifically pixel values) generated for the first region into the second region. Thus, typically the rendering image content of the first region is extrapolated into the second region.

The first and/or second region may comprise a plurality of disjoint areas.

In accordance with an optional feature of the invention, the image generator further comprises a blur processor for applying a spatially varying blurring to the image, a degree of blurring being higher in a transitional region between the first region and the second region than for an internal area of the first region.

The invention may in many embodiments and scenarios allow improved images to be generated. In particular, an improved perceived image quality may be achieved even when the generated image includes one or more areas for which the 3D image data does not provide any image data. In particular, the degradation effect typically associated with extrapolation may be substantially reduced, and may in many scenarios not be noticeable to the user.

The blurring of the transition region may in particular reduce the perceptual impact. Further, in embodiments wherein the rendering viewpoint is determined by a user input, the approach, and in particular the blurring, may bias users away from the viewpoints for which large degrees of extrapolation is necessary.

In accordance with an optional feature of the invention, the transitional region includes an area of the first region.

This may provide particularly advantageous operation in many scenarios. It may for example in many embodiments introduce a bias away from areas of the scene for which the 3D image data does not comprise any data.

This may result in an improved image to be generated which specifically may be better adapted to the specific characteristics of the available 3D image data.

According to an aspect of the invention there is provided a method of generating an image, the method comprising: receiving 3D image data for a scene, the 3D image data providing an incomplete representation of the scene; receiving a target view vector indicative of a target viewpoint in the scene for the image; providing a reference view vector indicative of a reference viewpoint for the scene, the reference view vector being determined in response to a border view vector indicative of a border between a part of the scene for which the 3D image data comprises image data and a part of the scene for which the 3D image data does not comprise image data; generating a rendering view vector indicative of a rendering viewpoint as a function of the target viewpoint and the reference viewpoint for the scene, including biasing the rendering view vector away from the part of the scene for which the 3D image data does not comprise any data for at least some values of the target view vector; and generating the image in response to the rendering view vector and the 3D image data.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

The following description focuses on embodiments of the invention applicable to generation of images for a virtual reality application. However, it will be appreciated that the invention is not limited to this application but may be applied in many different image processing and generating applications.

Figure 1:
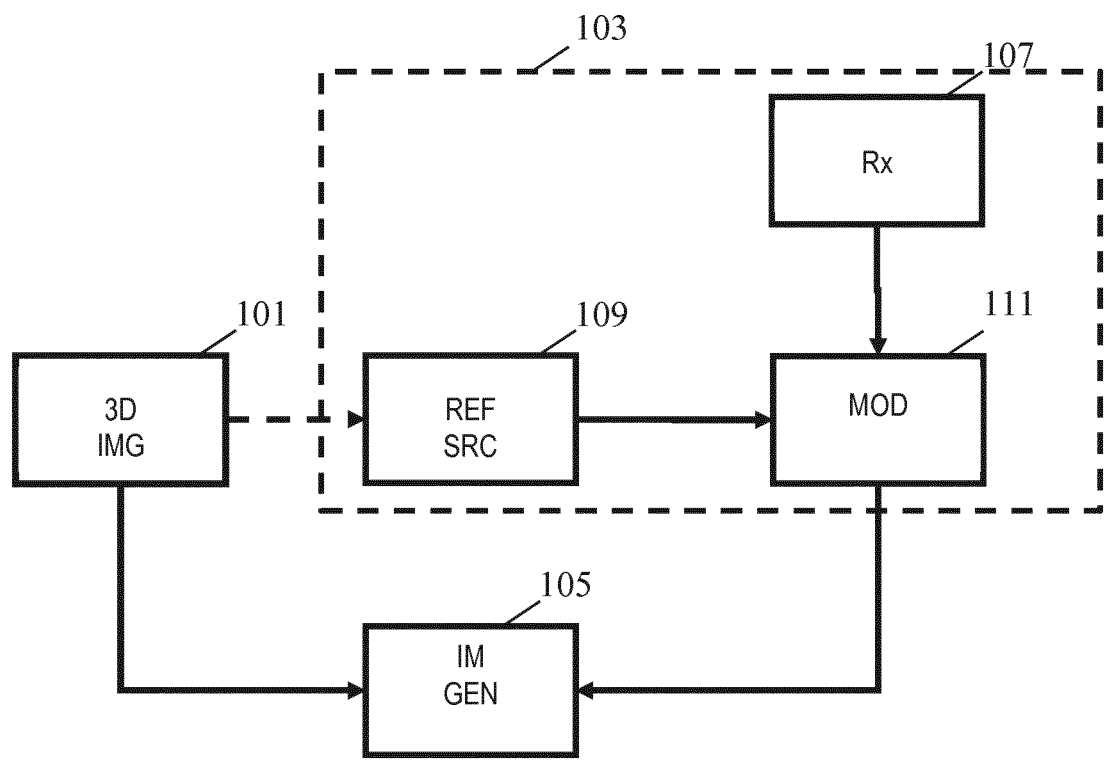
FIG. 1 illustrates an example of an image generating apparatus in accordance with some embodiments of the invention.

FIG. 1 illustrates an image generating apparatus which is arranged to generate an image representing a view of a scene based on 3D image data which provides an incomplete representation of a scene. The image generating apparatus of FIG. 1 may specifically be a renderer used as part of a virtual reality device or server providing a virtual reality experience.

Figure 2:
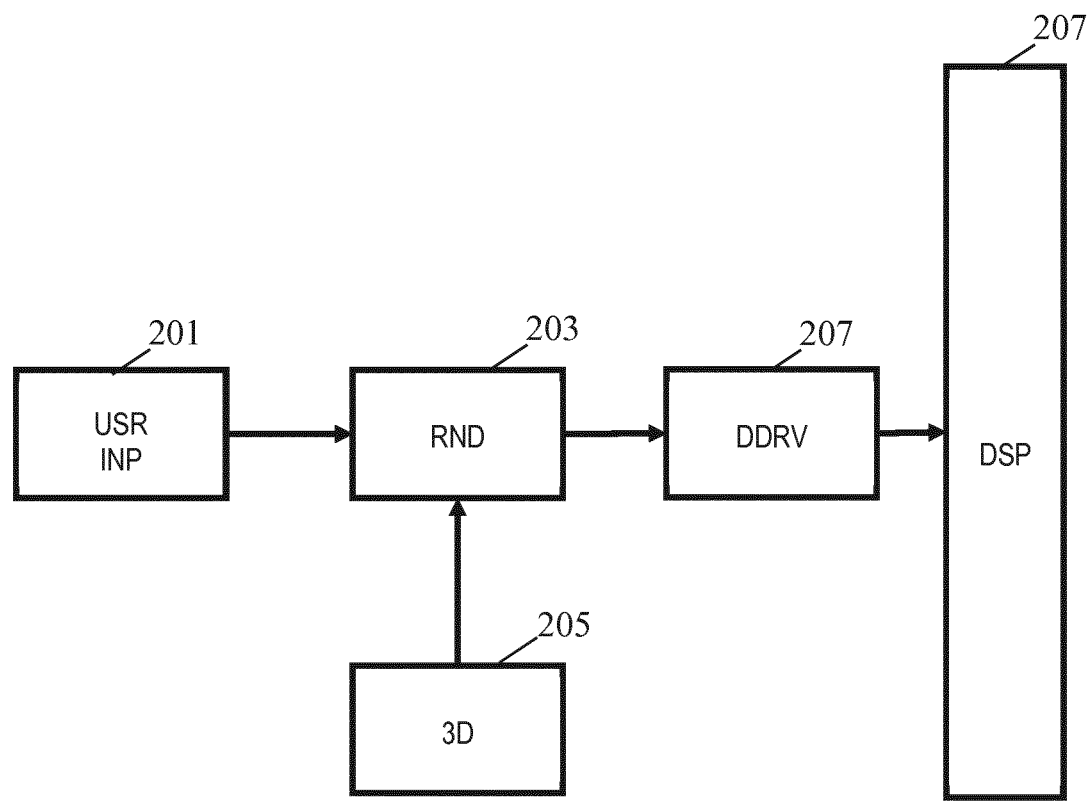
FIG. 2 illustrates an example of a virtual reality device comprising an image generating apparatus in accordance with some embodiments of the invention.

An example of such a virtual reality device is illustrated in FIG. 2. In the example, the virtual reality device comprises a user input unit 201 which is arranged to receive a user input that may reflect a desired movement and/or orientation in the virtual reality scene. For example, a user may navigate through a virtual reality scene using a joystick and/or keyboard, or e.g. the orientation of the view may be determined from a virtual reality headset worn by the user and comprising suitable sensors. In many embodiments, the user input unit 201 may comprise functionality for converting the user input into a desired rendering viewpoint which indicates the position from which the scene is viewed and/or the orientation of the view from a given view position. The rendering viewpoint (viewpoint may be considered to refer to a position indication, an orientation indication, or both, thus indicates the desired view for a user).

It will be appreciated that in some embodiments, a plurality of views may be generated for a given rendering viewpoint, or in some embodiments a plurality of viewpoints may be generated from the same user input. For example, the virtual reality device may be arranged to generate an image corresponding to a right eye view and an image corresponding to a left eye view, thereby providing a 3D effect. For brevity and clarity, the following description will focus on the generation of one image for a given rendering viewpoint.

The user input unit 201 may specifically be arranged to generate a target view vector which is indicative of a desired/target rendering viewpoint. For example, a target view vector may be generated which comprises three components/values defining an orientation of the viewer, such as e.g. a pitch, yaw, and roll parameters. In many embodiments, the target view vector may additionally or alternatively comprise three values defining a three dimensional position in the scene, e.g. represented by an x, y, z value. It will be appreciated that in some embodiments, the position and/or the orientation may be represented by fewer than three values. For example, a position may be indicated by a distance along a predetermined route through the scene, and thus the position may be indicated by a single value. Similarly, a pitch and yaw may be assumed constant and the orientation may be given only be a roll value.

The generated target view vector is fed to the rendering unit 203 which specifically is the image generating apparatus of FIG. 1. The rendering unit 203 is arranged to generate an image for the viewpoint reflected by the view vector. The generation of the image is dependent on 3D image data retrieved from a 3D image store 205. The generated image is fed to a display driver 207 which drives a display 209 which for example may be a display of a virtual reality headset for the right or left eye. The virtual reality headset may further comprise sensors that provide a user input to the user input unit 201.

Thus, the virtual reality device may generate images representing views from specific viewpoints in a virtual scene represented by 3D image data. The viewpoint is controlled by a user input allowing the user to typically both move and look around in the virtual scene.

In the approach, the 3D image data provides an incomplete representation of the scene. The 3D image data may specifically provide data for some parts of the scene but not for all parts of the scene, i.e. in particular there may be some regions/parts/elements of the scene for which the 3D image data for at least some viewpoints does not comprise any data describing the visual properties of the scene.

In many virtual reality applications, 3D image data may be provided in the form of a 3D model of the scene. In many applications, such a 3D model may provide a complete representation of the scene, and evaluating the 3D model will allow a view image to be generated for all possible viewpoints. This situation may often be the case for virtual or artificial scenes where a model directly defines the environment and scene. However, in many situations, it is not possible or feasible to generate a complete model. This may be the case for some artificial models but more frequently occurs for captured representations of real life scenes. For example, a model may be generated from a capture of a real-world scene but this model will tend to have missing data for at least some viewpoints (positions and/or orientations).

In many embodiments, the 3D image data may be generated from a capture from real life data using suitable cameras. Indeed, typically, 3D image data may be provided in the form of light intensity images and associated depth information for a number of fixed view positions. The images may in some such examples correspond to extremely wide view angles, and indeed may in some situations be almost fully omnidirectional. In such situations, the images and depth of the 3D image data may be used by viewpoint shifting algorithms to generate a view image for a given rendering viewpoint.

However, typically a capture from a given viewpoint will not be complete and provide full spherical image (and depth) and depth but rather only a subset of the sphere will be captured. This is typically also the case even in situations where a full spherical capture device is used as the capture process inherently tends to introduce objects blocking the view to some parts of the scene (e.g. the crew, lighting equipment or indeed the camera system itself may block views (e.g. the camera may observe itself or may observe other cameras used for capturing).

Regardless of how the 3D image data is represented, it will typically comprise no, or at least incomplete or insufficient, data for at least part of the scene, and thus often comprise no, or at least incomplete or insufficient, data for parts of a viewport for a given viewpoint.

The rendering unit 203, corresponding to the image generation apparatus of FIG. 1, is capable of generating images for a given rendering viewpoint based on 3D image data which provides only an incomplete representation of the scene. Further, the rendering unit 203 is arranged to generate the image to provide an improved immersive effect with the impact of the lack of image data being less noticeable or inconvenient to a user. For example, a virtual reality viewer may have a smoother and more immersive experience when looking around and encountering regions for which the 3D image data does not provide any information.

The rendering unit 203 comprises an image data receiver 101 which is arranged to receive 3D image data for a scene where the 3D image data provides an incomplete representation of the scene. In the specific example, the image data receiver 101 is coupled to the 3D image store 205 from which it receives the 3D image data. It will be appreciated that the 3D image data may be received from any suitable external or internal source, including for example over the Internet.

The rendering unit 203 further includes a view vector source 103 which is arranged to provide a rendering view vector which reflects a viewpoint for which a view image is to be rendered. In the specific example, the view vector source 103 is arranged to receive a target view vector which is indicative of a desired rendering viewpoint in the scene. In the specific example, the view vector source 103 is arranged to receive the target view vector from the user input unit 201. A view vector may be any set of one or more values providing an indication of a viewpoint. Specifically, a view vector may be any set of one or more values providing an indication of a position and/or orientation for the viewpoint. A view vector may typically include three component values indicating a position (e.g. x, y, z) or an orientation (yaw, roll, pitch), or three component values indicating a position (e.g. x, y, z) and an orientation (yaw, roll, pitch). It will be appreciated that a view vector may include a different number of components, for example an orientation may be given by only an azimuth and elevation/altitude value (or indeed in some cases only by an azimuth value). In such cases, additional degrees of freedom may be considered to correspond to predetermined, default, or estimated values.

The image data receiver 101 and view vector source 103 are coupled to an image generator 105 which is arranged to generate an image corresponding to the viewport for the viewpoint represented by the rendering view vector that is provided by the view vector source 103 based on the provided 3D image.

As the 3D image data provides an incomplete representation of the scene, the image being generated by the image generator 105 can for some viewpoints only generate part of the image by direct image synthesis from the 3D image data. Therefore, in many embodiments, the image generator 105 may be arranged to directly render the parts of the image for which the 3D image data provides image data. The missing parts of the image may in some embodiments then simply be filled with a predetermined color or texture. In many embodiments, the image generator 105 may be arranged to fill in the missing parts of the image by use of a suitable extrapolation algorithm.

However, whether a simple filling using predetermined data or a more complex extrapolation is employed, the resulting image quality will tend to be substantially reduced for areas of the image for which no data is present.

In order to address such issues, the view vector source 103 of FIG. 1 comprises functionality for (potentially) modifying the rendering view vector relative to the target view vector, and specifically to make this modification based on a reference view vector.

In the example, the view vector source 103 comprises a receiver 107 which is arranged to receive the target view vector being indicative of a target viewpoint for the image to be generated. In the example, the target view vector is received from the user input unit 201 and reflects the user's desired or target viewpoint (often both position and orientation). Thus, in the example, the input view vector is a desired/target view vector which is indicative of a target viewport for a target viewpoint for which the user would ideally like the view/image to be generated. Typically for a virtual reality application, this corresponds to the position and orientation of the virtual user in the virtual reality/environment/scene.

The rendering unit 203 further comprises a reference source 109 which is arranged to provide a reference view vector which is indicative of a reference viewpoint for the scene. The reference viewpoint may be used to provide information indicative of relationships between viewpoints and the parts of the scene/environment for which the 3D image data does not provide data. As will be described in more detail later, the reference view vector may e.g. indicate a preferred or suggested viewpoint (e.g. suggested by a director), or may e.g. reflect a viewpoint corresponding to an edge of a part of the scene for which the 3D image data comprises data.

In some embodiments, the reference view vector may be generated to be indicative of a plurality of viewpoints, such as a set of specific reference viewpoints or a continuum or range of possible viewpoints. The following description will be based on a situation wherein the reference view vector is indicative of one reference viewpoint but it will be appreciated that it can be extended to scenarios wherein the reference view vector is indicative of more than one viewpoint. For example, in most such scenarios, the processing can be reduced down to considering a single reference viewpoint selected based on the specific circumstances, such as e.g. the one that is closest to the target view vector. As another example, the described processing may be performed for different possible values of the reference view vector to provide different possible rendering view vectors from which a single vector is selected (e.g. the one closest to or furthest from the target view vector depending on the specific embodiment).

The receiver 107 and the reference source 109 are both coupled to a modifier 111 which is arranged to generate the rendering view vector as a function of the user desired viewpoint and the reference viewpoint for the scene, i.e. as a function of the reference view vector and the target view vector. The resulting rendering view vector is then used to generate the image as previously described.

The approach may provide a more efficient approach and may to some extent constrain or bias the virtual movement and orientation of the user such that the generated images tend to be for parts of the scene for which the 3D image data comprises data. The approach may typically provide an effect where the user's viewpoint is biased or shifted away from viewpoints for which the 3D image data does not provide sufficient data and towards viewpoints for which it does provide data.

As an example, as a user turns his head around (e.g. towards the back), and thus eventually towards views for which there is no captured content, the virtual rotation in the virtual environment may at first follow the user exactly but as the viewport moves into the empty part it may move less thereby breaking the direct correspondence with the users actually move, but providing rendered images that include more of the captured content. Thus, an effect may be achieved where the system does not follow the user movement fully but rather has a tendency to "stick" or be attracted to parts of the scene for which content is available, i.e. towards higher quality views.

For example, for a given position, the 3D image data may comprise data for an angle from −140° to +140° relative to a given reference direction which corresponds to the capturing cameras main direction, i.e. to the central direction for the captured image data stored as part of the 3D image data. In this case, a user who starts to (virtually) turn his head around may at first be presented with a view that follows the changed view direction fully. If, for example, the display generates an image that corresponds to 60° viewing span, the rendering view vector may be generated to follow the target view vector for an angle up to +110° with respect to the camera reference direction. In this case, a complete image can be rendered for the corresponding viewport/image as the 3D image data provides complete data and no extrapolation is needed.

However, as the user keeps turning his head, the target view vector/viewpoint will move into the part for which the 3D image data does not comprise data and extrapolation will be required. In order to reduce the proportion of the image for which extrapolation is required, and thus the proportion of the image for which the quality is reduced, the rendering view vector may now be generated to not follow the target view vector exactly but rather to be modified to be closer to the central camera reference. For example, as the user moves to result in a target view vector representing an (azimuthal) angle in the interval from +110° to +180°, this may (typically non-linearly) be mapped to a rendering view vector representing an angle which falls in the interval from +110° to +140°, i.e. the angular interval from +110° to +180° may be (non-linearly) mapped to the angular interval from +110° to +140° such that an angle of the target view vector within the former interval is mapped to an angle of the rendering view vector within the latter interval. Thus, as the user moves such that the viewport moves into the part for which no 3D image data is present, the corresponding movement for the rendering viewport is reduced. The effect to the user is that the virtual movement does not fully follow the user input but instead the presented view tends to be biased towards some preferred view directions. However, although this may be considered a disadvantageous effect to the user, it is typically outweighed by the advantageous effect of the presented image being of relatively high quality and by the fact that views with extremely reduced quality can be avoided altogether in many embodiments.

In essence, a "rubber band" effect can be achieved where different preferences pull on the rendering view vector but in different directions. On one side of the "rubber band" is the target view vector which corresponds to the user's preferred viewpoint. The target view vector pulls on the rubber band to attract the rendering viewpoint. On the other side of the "rubber band" is a reference view vector representing one or more viewpoints corresponding to parts of the 3D image data for which 3D image data is present. The two ends of the rubber band pull the rendering viewpoint in different directions and the resulting rendering viewpoint/view vector will depend on the relative "pull" of these factors and the resulting "stretching" of the rubber band. Indeed, the rendering view may be pulled towards the preferred view directions with this pull typically increasing the further the user moves from these preferred view directions. (It will be appreciated that the "rubber band" analogy is not intended as a specific, limiting, or accurate explanation but is merely intended to provide an intuitive indication of the effects that may be achieved).

Although the approach may restrict the free virtual movement of a user, it has in many scenarios been found to provide a substantially improved user experience and in particular a more immersive experience. Indeed, this has been found to be the case, not only in embodiments where an indirect virtual movement control is implemented (e.g. movement of a joystick or mouse) but also in embodiments where the virtual movement, and thus the generated target view vector, is intended to directly mirror a user's movement. For example, it has been found to often provide an improved user experience even in applications where the virtual user experience is based on a headset tracking the user's head movements.

It will be appreciated that the specific function used by the modifier 111 to determine the rendering view vector as function of the reference view vector and the target view vector will depend on the specific requirements and preferences of the individual embodiment. For example, it may depend on the specific viewpoint that is used for the reference viewpoint/view vector.

However, in many embodiments, the modifier 111 is arranged to determine the rendering view vector to increase a distance from the rendering view vector/viewpoint to the target view vector/viewpoint for an increasing distance from the target view vector/viewpoint to the reference view vector/viewpoint. Thus, in most embodiments, the change applied to the target view vector in order to generate the rendering view vector increases the further the target view vector is from the reference view vector. Typically, the reference view vector is indicative of a preferred viewpoint and therefore the distance between the target view vector and the reference view vector is indicative of how much the current target viewpoint of the user deviates from the preferred view vector. Accordingly, an increasing modification is applied to the target view vector to achieve a resulting rendering view vector which is closer to the preferred viewpoint the further the target view vector deviates from the preferred viewpoint vector.

It will be appreciated that the terms viewpoint and view vector may be considered to be equivalent as the view vector provides the representation (as a set of values) of the corresponding viewpoint. Accordingly references to e.g. modifications of, distances between, comparisons of etc. view vectors are equivalent references to modifications of, distances between, comparisons of viewpoints, and vice versa. The following description will focus on references to view vectors.

In many embodiments, the modifier 111 may specifically be arranged to determine the rendering view vector such that a ratio between a distance from the rendering view vector to the reference view vector and a distance from the rendering view vector to the target view vector is decreased for an increasing distance from the target view vector to the reference view vector. Thus, the ratio of the relative distances from the rendering view vector to respectively the reference view vector and the target view vector decreases for increasing deviation between the target view vector and the reference view vector.

For example, the rendering view vector may typically be generated to be between the target view vector and the reference view vector (e.g. on a line between these or corresponding to a view direction/angle between these), and thus between the user desired viewpoint and the (3D image data based) preferred viewpoint. The relative position of the rendering view vector is changed such that when the target view vector is close to the reference view vector, the rendering view vector is close to the target view vector (or indeed is identical to this). When the target view vector starts to deviate more from the reference view vector, the rendering view vector however effectively starts to move away from the target view vector and towards the reference view vector, i.e. the relative position of the rendering view vector is no longer as close to the target view vector. Thus, the relative distance to the target view vector increases whereas the relative distance to the reference view vector decreases (e.g. both distances being normalized with reference to the total distance between the reference view vector and the target view vector), and accordingly the ratio decreases. Indeed, when the rendering view vector is generated to be the same as the target view vector (for small deviations), the ratio between the distance to the reference view vector and the distance to the target view vector is infinite (the latter distance is zero). As the deviation increases and the relative distance between the rendering view vector and the target view vector increases from zero whereas the relative distance between the rendering view vector and the reference view vector decreases.

This approach allows the modifier 111 to generate a rendering view vector which is increasingly biased towards the parts of the 3D image data for which data is available the further the target view vector moves towards or into parts for which the 3D image data does not provide data. Equivalently, the modifier 111 may be arranged to bias the rendering view vector away from parts for which the 3D image data does not provide data (for at least some values of the target view vector). This may e.g. be done by biasing the rendering view vector towards the reference view vector. For example, if the reference view vector is set as a preferred view direction, the reference view vector may be generated by biasing the target view vector towards the reference view vector (specifically reducing the distance between the rendering view vector and the reference view vector compared to the distance between the target view vector and the reference view vector for at least some values of the target view vector). In other embodiments, the biasing may for example be by biasing the reference view vector away from the reference view vector. For example, if the reference view vector is set as a border view vector indicating a border between an area (e.g. viewing angle) for which the 3D image data includes sufficient data and an area (e.g. viewing angle) for which the 3D image data does on include sufficient data, the modifier 111 may be arranged to generate the reference view vector by biasing the target view vector away from the reference view vector (specifically increasing the distance between the rendering view vector and the reference view vector compared to the distance between the target view vector and the reference view vector for at least some values of the target view vector).

As previously mentioned, the modifier 111 may in many embodiments be arranged to generate the rendering view vector to directly match the target view vector as long as this is sufficiently close to the rendering view vector. This provides a highly advantageous operation in many embodiments and scenarios, and indeed may result in the bias effect to not be applied unless it is actually desired or necessary. It may provide reduced perceptual impact and lead to a more immersive experience.

In many embodiments, the rendering view vector is generated such that the distance between the rendering view vector and the target view vector is a monotonically increasing function of the distance between the target view vector and the reference view vector. However, the monotonically increasing function is typically not a linear function but rather is typically a non-linear function, and is typically non-linearly increasing such that the change or modification increases for increasing deviations between the target and reference view vectors.

As previously mentioned, in many embodiments and scenarios, the modification applied to the target view vector is very small or indeed zero unless the target view vector differs from the reference view vector by a significant amount. For example, in the above example, the rendering view vector is identical to the target view vector until this difference reaches +110°, i.e. in the example the rendering view vector is identical to the target view vector until the viewport/image starts to include an element of the part of scene for which the 3D image data comprises no data, i.e. until the point where the first region does not fill the entire image. Further, the effect may typically be gradually increased from then on, i.e. a non-linearly increasing function may be applied.

These effects may provide an experience where the bias effect is gradually increased and typically is non-existent and/or non-noticeable until the target view vector has moved so far that significant degradation of the image occurs. However, as the target view vector moves further into parts of the scene for which the 3D image data has no data, the effect increases, at first gradually and significantly and for further movement with a more and more aggressive effect.

It will be appreciated that any suitable distance measure may be used to evaluate the distance. In many scenarios, the distance between two view vectors may be considered to be a distance between the corresponding parameters in the virtual scene. In many embodiments, the distance may be an angular distance such as an angular difference between orientations or view directions represented by the two view vectors from a given position in the scene. In many embodiments, the distance may be determined in response to a direct comparison of the view vector, for example by directly comparing one or more values of the view vectors.

In the example above, the reference view vector is considered to be a view vector indicative of a central viewpoint for the capture of a scene, such as for example the main direction of a substantially omnidirectional camera. Such a scenario may for example be advantageous in embodiments in which the user is fixed at a virtual position in the virtual environment, where the fixed position corresponds to that of the camera. Thus, in particular, it may provide highly advantageous performance for applications wherein the user is considered to be stationary at the position of the capturing camera but provided with the means to "look around" in the scene, i.e. where the viewpoint changes are restricted to view orientation changes.

However, in other embodiments, the 3D image data may comprise data captured by more than one camera and/or may allow the user to move position as well as orientation. In many such embodiments, a single fixed capture reference view vector may not be optimal.

In some embodiments, the system may receive the 3D image data as a data stream (including as a data file) which accordingly provides the 3D image data representation of the virtual scene/environment. The 3D image data may be provided in this format by a content provider who accordingly may provide a virtual scene/environment which can be explored or otherwise used to provide the virtual reality experience.

In some embodiments, such a data stream providing the 3D image data may provide nominal viewpoint data. The nominal viewpoint data may be indicative of nominal viewpoints for the 3D image data. This nominal viewpoint data may specifically provide information indicative of the parts for which the 3D image data comprise data and the parts for which part it does not.

As an example, the nominal viewpoint data may indicate one or more preferred viewpoints. For example, preferred view directions or orientations may be provided for different positions in the scene. For example, for each position in the virtual environment, a preferred view direction/orientation may be provided. The preferred view direction may for example indicate the view direction which has the maximum distance to the nearest part of the scene for which the 3D image data does not provide any data.

It will be appreciated that in many embodiments, such preferred direction information can be provided without resulting in a significant data overhead. For example, in many embodiments, one preferred view direction indication may be suitable for covering a large number of positions, and possible all positions. For example, if the capture has been made by one or more cameras on a baseline and facing in the same direction (with the missing data of the 3D image data corresponding to the part of the scene directly behind the camera and thus directly in the opposite direction of the camera direction), the preferred view direction for all positions may simply be given as that camera direction.

In other embodiments, a differentiated approach may be used where different positions have different preferred view directions. For example, if there is an obstruction causing missing data, the preferred direction for a given position may be in the direction that is facing away from the object.

In some embodiments, the preferred view direction may be time varying. For example, the nominal viewpoint data may describe a path through the virtual environment represented by the 3D image data. In this way, a guided or controlled experience can be provided. E.g. the content provider may provide a narrative experience with the movement of the user through the scene being controlled but with the user being free to look around from the given position. However, the nominal viewpoint data may provide a recommended position and view orientation as a function of time. A virtual reality application may in the absence of any conflicting instructions being received from the local user proceed to render and display the corresponding images. However, if a user input is received which is indicative of e.g. the user turning the head to look around, the system may modify the rendering view vector accordingly, i.e. the rendering view vector may be generated to differ from the nominal view direction.

In such examples, the rendering unit 203 may be arranged to generate the rendering view vector from the nominal viewpoint data, and may specifically generate the rendering view vector to correspond to the indicated nominal viewpoint unless a user input instructs otherwise. In this case, the rendering view vector is modified relative to the nominal viewpoint to reflect the user input. However, in many embodiments, this process may be subject to the described approach of making the rendering view vector dependent on the distance between the target view vector and the reference view vector. Specifically, the nominal viewpoint may be used to generate a corresponding reference view vector with the user input generating the target view vector (possibly relative to the reference view vector). The rendering view vector may then be generated as described for the example where the reference view vector corresponds to a capture camera direction.

The approach may for example allow a content provider to "direct" a virtual reality experience in order to provide e.g. a narrative. The user may still be allowed some freedom but this may be constrained or biased towards the "directors" recommended view direction in order to reduce the impact of data missing for other directions.

It will be appreciated that the nominal viewpoint data need not provide an explicit description of a direction. For example, in some embodiments, the 3D image data may be provided in the form of a temporal sequence of substantially omnidirectional images. A central point of each of these omnidirectional images may be considered to be a nominal reference viewpoint, i.e. it may specifically be considered to be the nominal orientation for the position from which the omnidirectional image was captured.

If the user does not provide any input, an image is rendered by selecting the appropriate central part of the received omnidirectional image. However, if the user indicates a shift in view orientation, e.g. by looking around, the rendering unit 203 selects a different section of the omnidirectional view to correspond to the desired orientation. However, in order to reduce the risk of this section including a substantial part of the missing part of the scene, the described approach of biasing the rendering view vector towards the reference view vector is applied. Thus, the rendering view vector which may be generated to indicate which section of the omnidirectional image to present, will be biased away from selections that would cause it to include significant sections of the part of the omnidirectional image that does not comprise (valid) image data.

Figure 10:
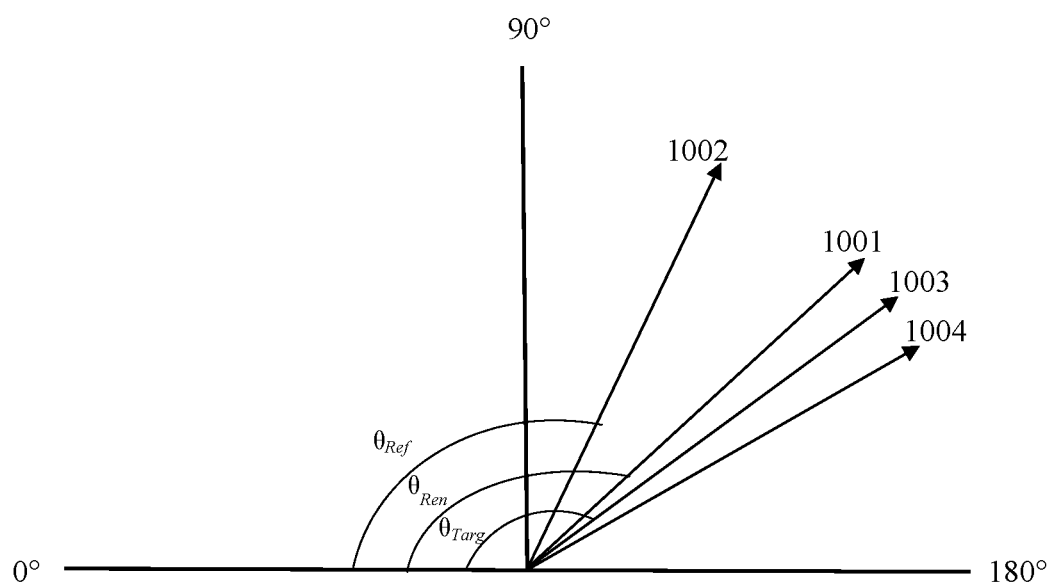
FIG. 10 illustrates an example of view vectors of an image in accordance with some embodiments of the invention.

The reference source 109 may determine the reference view vector in response to a border view vector 1004, e.g., shown in FIG. 10, which is indicative of a border between a part of the scene for which the 3D image data comprises image data and a part of the scene for which the 3D image data does not comprise image data.

For example, for a given viewpoint position, the reference source may determine an angle for which the 3D image data transitions from comprising image data to not comprising image data. For example, in the previous specific example, the 3D image data comprises image data up to an angle of 140°. The border view vector may accordingly be determined to correspond to this value, and the reference view vector may be set to this value (or it may e.g. be offset by a value corresponding to half the view angle represented by the display, i.e. to 110° in the example of a display representing a view angle of 60°).

Accordingly, the rendering view vector may be determined based on how the target view vector relates to the reference view vector, and thus to the border view vector. Thus, the rendering view vector may be determined directly based on how the target view vector relates to the transition from parts of the scene for which the 3D image data comprises data to parts for which it does not comprise data.

For example, as the target view vector indicates an angle that exceeds the reference/border view vector, the rendering view vector may be generated to have a reduced distance to the reference/border view vector. For example, in the previous specific example, if the target view vector indicates angles below 110°, the angle difference between this and the reference view vector may be considered to be negative. As it starts to exceed 110° the difference becomes positive and the rendering view vector may be generated such that the angle from the rendering view vector to the reference view vector is below the difference between the target view vector and the reference view vector. For example, referring to FIG. 10, for angles above 110°; the rendering view vector 1001 may be generated to correspond to an angle of:

$$\theta_{Ren} = \theta_{Ref} + 3.59 \cdot \sqrt{\theta_{Targ} - \theta_{Ref}}$$

where $\theta_{Ren}$ is the angle of the rendering view vector 1001 (in degrees), $\theta_{Ref}$ is the reference angle, i.e. 110°, of the reference vector 1002 and $\theta_{Targ}$ is the angle of the target view vector 1003 (in degrees). Thus, the target view vector angle interval of 110°-180° is non-linearly mapped to the rendering view vector angle interval of 110°-140°.

It will be appreciated that the applied relationship between the border view vector and the reference view vector may be different in different embodiments. In many embodiments, the reference view vector may simply be set to be identical to the border view vector. In other embodiments, the reference view vector may be set to a value which is offset with respect to the border view vector, such as e.g. 20°.

In yet other embodiments, the reference source 109 may consider an additional border view vector and may determine the reference view vector based on a plurality of border view vectors. For example, for a given position, it may be determined that 3D image data is available for an interval range of e.g. −120° to +140°, and thus a first border view vector may be indicative of the −120° border and a second border view vector may be indicative of the +140° border. The reference view vector may be determined as the midpoint between these, e.g. as +10° in the specific example. Thus, in some embodiments, the reference view vector may be determined from one or more border view vectors to reflect a desired view direction and in other embodiments it may be determined from one or more border view vectors to reflect an undesired view direction.

The determination of the rendering view vector may in many embodiments consider more aspects than just the target view vector and the reference view vector. For example, in embodiments where it is not practical to determine the reference view vector to correspond to a direction of a camera, it may still be possible and advantageous to consider viewpoints for the cameras.

In many embodiments, the 3D image data may be generated as a set of views from different viewpoints. Each of these views may correspond to an image (e.g. an omnidirectional image and/or a 3D image) for the corresponding viewpoint, typically as captured by a camera positioned at the position of the viewpoint and with the orientation of the viewpoint, In such examples, the 3D image data will typically include data defining the viewpoints (this information is also used to render the image for a given viewpoint). This information may also be taken into account when generating the rendering view vector. For example, the rendering viewpoint may be biased towards viewpoints that result in a reduced distance with respect to the viewpoints of the 3D image data.

As another example, the modifier 111 may be arranged to take into account the proportion of a viewport for the given rendering view vector for which the 3D image data comprises image data. For example, the non-linear function may be adapted dynamically to reflect how quickly the proportion of the image which needs to be generated by extrapolation/filling changes as a function of the target view vector.

For example, if the area of the image which needs to be generated by extrapolation increases very quickly as the rendering view vector changes, an aggressive effect may be applied which keeps the rendering view vector very close to the reference view vector (e.g. when this is given as a border view vector). However, if the change is only very gradual, a function may be applied which results in a much more gradual and less noticeable effect.

It will be appreciated that different algorithms and approaches for considering multiple parameters when determining the rendering view vector may be used in different embodiments. For example, the combined effect of the different parameters may be represented as a non-linear energy function J with multiple terms. A non-linear optimization algorithm may then be used to determine the rendering view vector as that which minimizes J. For example, a gradient descent approach may be used.

In many embodiments, the renderer 203 may be arranged to receive display property data which indicates one or more parameters of the intended display. The modifier 111 may then be arranged to consider such display properties when determining the rendering view vector.

For example, the rendering unit 203 may receive information of the view angle supported by the display. E.g., if the display is part of a virtual reality set, the display property may indicate the viewing angle that the display provides to the user wearing the headset. This information may then be used to determine the rendering viewing angle, for example as indicated previously by determining the reference view vector (e.g. by using it to determine the angle for which the edge of the display reaches the end of the part of the scene for which the 3D image data comprises data) or modifying the function applied.

In the previous examples, the reference view vector (and indeed other parameters) were typically considered to correspond to desirable or preferred characteristics/views. Accordingly, the rendering view vector is biased towards the reference view vector. However, in other scenarios or embodiments, the reference view vector may correspond to an undesired/non-preferred property. For example, a reference view vector may be provided which is indicative of a viewpoint (specifically orientation) for which the entire viewport will correspond to a part of the scene for which the 3D image data provides no data. In this case, the modifier 111 may be arranged to generate the rendering view vector by applying a bias away from the reference view vector.

For example, the reference view vector may indicate an angle to the center of a part of the scene for which no data is provided, e.g. towards 180° in the specific example previously described. In such a case, the rendering view vector may be generated to correspond to the target view vector as long as the difference between the target view vector and the reference view vector is sufficiently high. For example, as long as the angular difference between the reference angle and the target angle exceeds 70° the target view vector may be used directly as the rendering view vector. However, as the difference falls below 70°, a difference between the rendering angle and the target angle may start to be introduced, typically using a non-linear function similar to the previously described approaches.

Thus, in some embodiments, the modifier 111 may be arranged to increase a distance from the rendering view vector to the target view vector for a decreasing distance from the target view vector to the reference view vector.

In some embodiments, the modifier 111 may be arranged to decrease a ratio between a distance from the rendering view vector to the reference view vector and a distance from the rendering view vector to the target view vector for a decreasing distance from the target view vector to the reference view vector.

In some embodiments, the modifier 111 may be arranged to determine the rendering view vector as substantially the target view vector for a difference between the target view vector and the reference view vector being above a threshold.

Thus, in some embodiments, the reference view vector may be used as a detractor (push away) whereas it in other embodiments may be used as an attractor (pull towards) for the target view vector.

It will be appreciated that in many embodiments, the modifier 111 may simultaneously consider a plurality of different reference view vectors, including simultaneously considering both attracting and detracting reference view vectors. This may for example be accomplished by defining a suitable energy function or cost function and using gradient search to maximize or minimize the chosen measure as appropriate.

In some embodiments, the virtual reality device may further comprise functionality for providing other types of feedback. For example, haptic feedback may be provided e.g. in the form of "force feedback" which is known from e.g. gaming applications. This may in particular be used in connection with the approach of modifying the target view vector. As an example, the larger the modification introduced to the target view vector to generate the rendering view vector, the larger the force feedback. In embodiments where the haptic feedback provides a directional stimulus, this may be arranged to have a direction urging the user in the desired direction. For example, using controllers such as joysticks and racing wheels, an impression of both the amount and direction of the "pull" on the target view vector may be conveyed to the user by means of a force feedback sensation.

Figure 3:
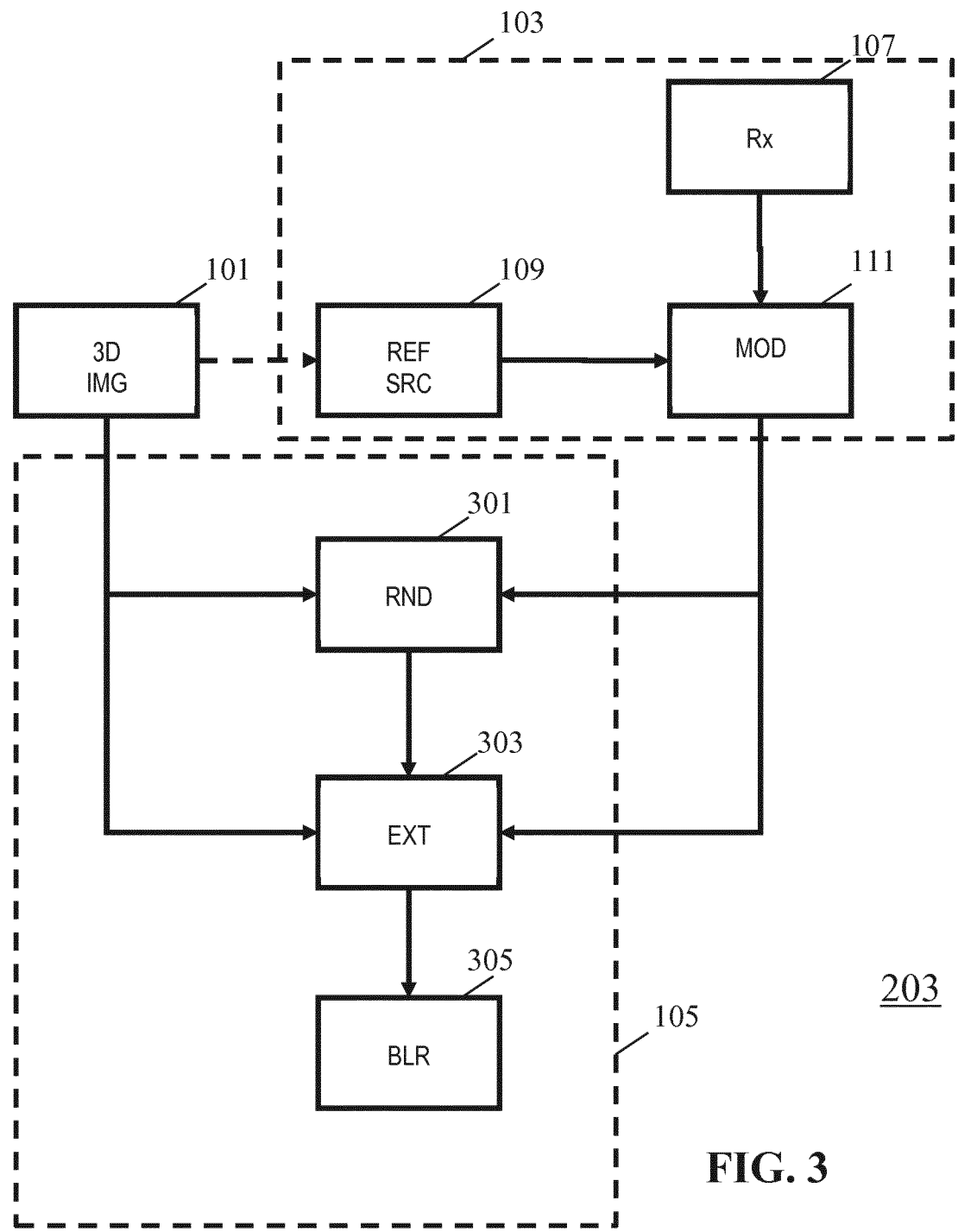
FIG. 3 illustrates an example of an image generating apparatus in accordance with some embodiments of the invention.

As mentioned previously, the image generator 105 may typically be arranged to generate the image using a two stage approach of rendering the parts of the image for which the 3D image data provides data and extrapolating into the parts of the image for which the 3D image data does not provide any data. An example of a rendering unit 203 based on such an approach is illustrated in FIG. 3.

In the example, the image data receiver 101 and view vector source 103 are coupled to a renderer 301 which is arranged to render the regions of the image for which the image data receiver 101 provides 3D image data for a given rendering viewpoint represented by a rendering view vector.

The renderer 301 may use any suitable approach for rendering an image for the rendering viewpoint as indicated by the rendering view vector, and it will be appreciated that the person skilled in the art will be well aware of various methods and these will accordingly for brevity not be described in detail herein.

As an example, if the 3D image data is provided as light intensity images plus depth maps (or e.g. by texture maps and 3D meshes) for different discrete viewpoints, the image for the viewpoint indicated by the rendering view vector may be generated by viewpoint shifting as is well known. If the 3D image data is provided in the form of a 3D model, this may be evaluated from the perspective of the viewpoint to generate the image content.

However, since the 3D image data provides only an incomplete representation of the scene, there will (for some rendering viewpoints) be areas of some images that cannot be rendered directly based on the available 3D image data. For example, if a user begins to turn around and look towards an area that has not been captured, the renderer 301 may only be able to generate the data for part of the image corresponding to the part of the scene which has been captured.

Thus, in many embodiments, the renderer 301 will be arranged to render only part of the image. Specifically, the renderer 301 may render one or more regions of the image with other regions of the image not being generated. In the following, a region in which the renderer 301 has rendered/generated image content will be referred to as a first region and a bordering region for which the renderer 301 has not generated any image data will be referred to as a second region.

It will be appreciated that the reference to a first and second region does not imply that the image is necessarily divided into one area in which image content has been rendered and one area wherein image content has not been rendered. Rather, there may be a plurality of regions for which the renderer 301 generates image content and/or a plurality of regions in which the image content does not generate image content. Alternatively, and equivalently, the first region may be considered to potentially comprise a plurality of distinct areas in which the renderer 301 has generated image content and/or the second region may be considered to comprise a plurality of distinct areas in which the renderer 301 has not generated image content.

The rendering unit 203 of FIG. 3 is arranged to address such situations. Rather than merely leave the unrendered area(s), the second region, empty or filled in by a default color, the renderer 301 is coupled to an extrapolator 303 which is arranged to extrapolate the 3D image data from the first region into the second region. Thus, the extrapolator is arranged to generate image content for the second region from the image content/3D image data of the first region. Specifically, in most embodiments, the 3D image data is extrapolated from the first region into the second region by extrapolation of the image content (pixel values) of the first region being extrapolated into the second region.

In this way, the image generator may proceed to generate a complete image comprising image content for all parts of the image corresponding to the viewport for the rendering viewpoint as represented by the rendering view vector. However, whereas the image content for the first region is likely to provide a very accurate reflection/representation of the view/scene, the image content of the second region is likely to provide a degraded, and often very substantially degraded, representation of the view/scene. For example, in many embodiments, the extrapolator 303 may only be arranged to generate a relatively coarse texture or color distribution resembling that of the image content of the first region close to the second region. However, the generated image content for the second region is still likely to be less noticeable or disturbing to a viewer than e.g. a predetermined uniform color (e.g. black) and thus will tend to provide an improved user experience.

It will be appreciated that any suitable approach for extrapolating image content of the first region into the second region may be used without detracting from the invention. Specific examples of extrapolation will be described later.

In the specific example of FIG. 3, the image generator 105 however does not merely extrapolate image content into the second region to provide a fully filled image but further includes a post-processing which improves the perceptual effect and typically results in an improved and more immersive user experience.

Rather, in the specific example, the image generator 105 comprises an optional blur processor 305 which receives the image from the extrapolator 303. The blur processor 305 is arranged to apply a spatially varying blurring to the image where the degree of blurring is higher in a transitional region between the first and second region than (at least) for an internal area of the first region. Thus, for a transitional region an intentional blurring of the image is introduced. In many embodiments, the transitional region includes an area of the first region, and thus the blur processor 305 introduces blurring to the image content generated by the renderer 301 to create a blurred transition from the image content that can be generated from the 3D image data and to the extrapolated image content.

It has been found that this blurring of the transition region tends to provide a substantially improved user experience where in particular a more immersive experience can be achieved. The viewer will typically not notice that the current view includes part of the scene which is not represented by the 3D image data but will merely subconsciously notice that the image becomes blurred when looking in some directions. The approach will further tend to modify the behavior of the viewer and in particular will tend to bias the user away from looking in directions for which no 3D image data is available. This bias further tends to be subtle and often subconscious. In particular, the spatial blurring being performed on part of the first region, i.e. on image content generated from available 3D data results in the blurring often having a subtle effect that is not detected by a user. However, it still provides a subtle blurring effect and typically a lack of detail and focus which will bias the viewer towards looking in other directions.

For example, as a viewer turns his head, he may at first view images that are fully generated from available 3D image data and which are therefore sharp and detailed. However, at some point, the edge of the available 3D image data is reached and the viewer will in this case start to first be provided with an image area that still contains details (e.g. it includes image objects derived from the 3D image data) but with these starting to become more blurred. This effect is achieved by intentionally and counterintuitively removing information of the generated image which is derived from the 3D image data. Thus, rather than providing an image which represents the scene as well as possible, the blur processor 305 intentionally blurs a transitional region between the first and second region (and specifically blurs part of the sharp rendering of the transitional region of the first region) and thus intentionally reduces the accuracy of the presented view of the scene. However, this degradation can be controlled by the blur processor 305 rather than be completely dependent on the accuracy of the extrapolation in the specific case.

Accordingly, a more gradual transition can be achieved with an initial element of the transition typically still being of relatively high quality, yet having the effect of tending to bias a viewer towards viewpoints for which the 3D image data comprises data for a full view. It has been found that this effect tends to provide a perceptually better user experience and in particular for virtual reality experiences provide a more immersive experience.

The blurring may for example be performed using a blurring filter, such as specifically a spatial low pass filter. The strength of the spatial low pass filter may be varied such that it is stronger for the transitional region than for an internal area of the first region. Thus, there exist an internal area in the first region wherein the strength/degree of blurring/low pass filtering is less than for the transitional region. Typically, the blur processor 305 does not provide any low pass filtering or blurring of the internal area, and therefore the internal area (which typically may be the majority of the first region) is rendered as sharply as possible.

The degree of blurring may for example be varied by varying the spatial cut-off frequency for the spatial low pass filter. For example, a suitable kernel shape may be used with the spatial extent of the kernel being varied depending on the current filter position and how that relates to the transitional region. For example, within the first region and outside the transitional region, the spatial extent of the kernel may be set to 1 pixel, i.e. no filtering is applied. Within the transitional region, the spatial extent of the kernel may be increased to e.g. a predetermined size thereby resulting in a spatial low pass filtering and blurring.

In many embodiments, the blurring may be gradually increased. For example, the size of the kernel may be gradually increased from a typically small value at the border/edge between the transition region and the remaining part of the first region to a larger value at the border between the transition region and the (remaining part of) the second region.

For example, the blurring filter may be a spatial filter with a Gaussian kernel, and with the size of the kernel being given by its sigma value. In such embodiments, the sigma value applied to the Gaussian filter for pixels in the transitional region may be determined as a monotonically increasing function of the distance from the pixel to the border between the transitional region and the remaining part of the first region, or a monotonically decreasing function of the distance from the pixel to the border between the transitional region and the remaining part of the second region (or both).

Such an approach may provide an increasing blurring, and a gradual image degradation, to cause a bias away from views for which the 3D image data provides only little or no information.

It will be appreciated that the filtering which is applied to the second region (or specifically the part of the second region which is outside the transition region in cases where the transition region extends into the second region) may depend on the specific embodiment, and indeed in many embodiments may depend on specific characteristics of e.g. the extrapolation and/or the 3D image data.

In many embodiments, the blur processor 305 may be arranged to reduce the degree of blurring in at least part of the second region with respect to a degree of blurring in the transitional region. Thus, in some embodiments, the blurring in the transitional region is higher than both at least parts of the first region and parts of the second region. The blurring may thus be increased for the transition between the first region and the second region but may then be reduced again for the extrapolated region. This may in many embodiments, and specifically for many extrapolation techniques, result in a perceptually more advantageous result and/or a lower complexity.

For example, many extrapolation techniques generate relatively coarse extrapolation with relatively slow varying changes. In such cases, the extrapolation result already exhibits a spatial low frequency characteristic and there is no need to further blur or filter the image content. Accordingly, the blur processor 305 may be arranged to apply the blur filter only to the transitional region thereby reducing the complexity and computational requirements.

The blur processor 305 accordingly applies a spatially selective filtering to the generated image which comprises both rendered and extrapolated regions. The blurring effect tends to not only bias the user towards desired views but also tends to provide an improved effect by further blending the rendered and extrapolated regions together.

Figure 4:
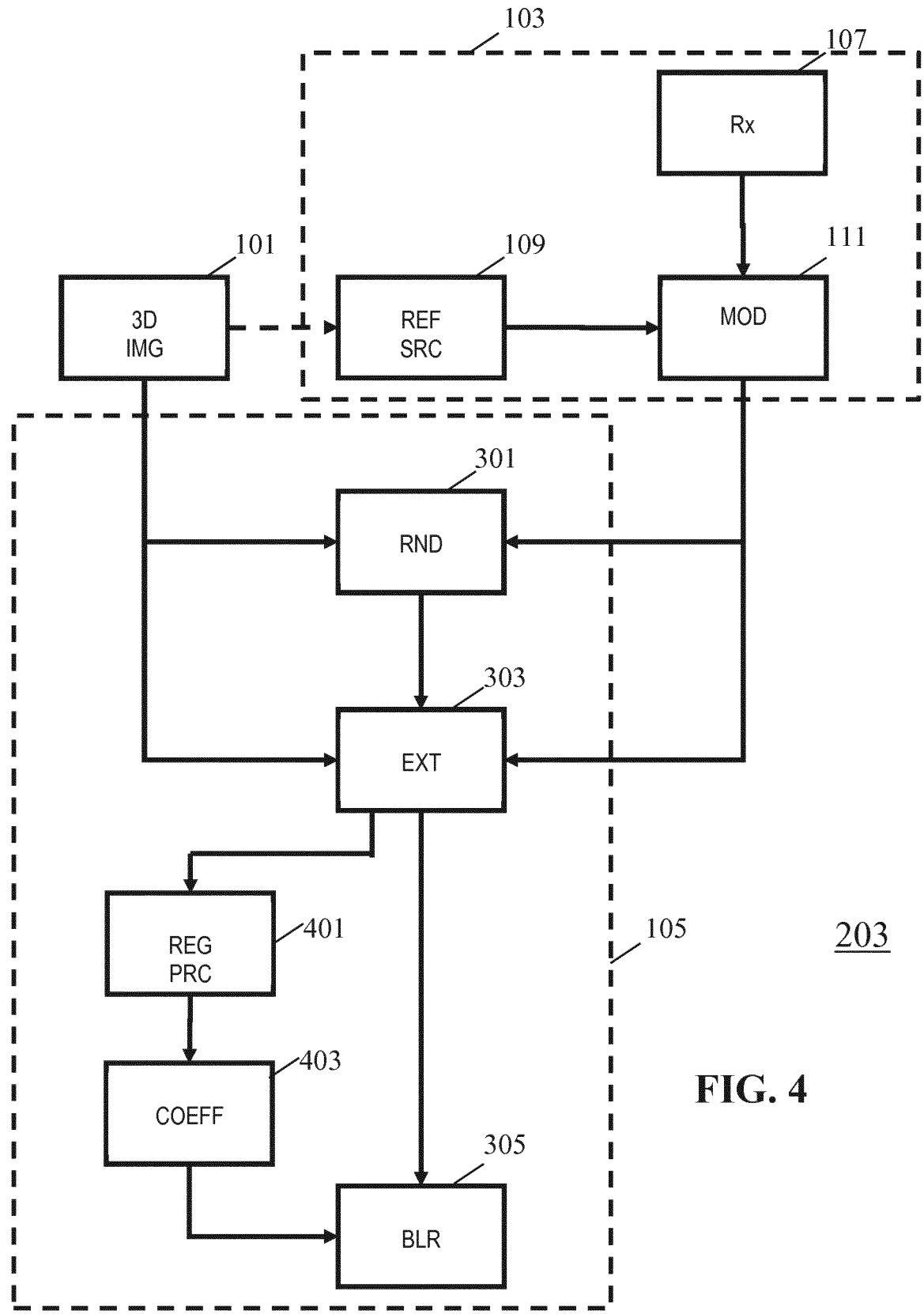
FIG. 4 illustrates an example of an image generating apparatus in accordance with some embodiments of the invention.

FIG. 4 illustrates a specific example of the rendering unit which corresponds to the example of FIG. 1 and further comprising specific functionality for determining properties of the blurring.

The rendering unit of FIG. 4 comprises a render region processor 401 which is arranged to determine a rendering mask for the image where the rendering mask is indicative of whether the individual pixels belong to the first region or not. Specifically, the rendering mask may for each pixel be indicative of whether the pixel value is generated by rendering from the 3D image data or whether it is generated by extrapolation.

In many embodiments, the rendering mask may comprise binary values, i.e. for each pixel the rendering mask may indicate whether the pixel is generated by rendering or by extrapolation, or equivalently whether it belongs to the first region or to the second region. In some embodiments, such a binary filter may be spatially low pass filtered to generate a gradual transition between the regions with gradual values indicating a transition region between the first and second region.

The render region processor 401 is coupled to a filter adapter 403 which is further coupled to the blur processor 305. The filter adapter 403 is arranged to determine a spatially varying filter characteristic for the image in response to the rendering mask. For example, a parameter controlling the degree/strength of low pass filtering may be determined based on the mask value of the pixel. For example, for a filtered rendering mask, the low pass filtering strength parameter value may be determined as a predetermined function of the rendering mask value for the pixel. Thus, in a transitional region being defined by intermediate rendering mask values, a gradually changing low pass degree parameter is defined.

The spatially varying filter characteristic is then fed to the blur processor 305 which proceeds to filter the image using a spatial filter adopting the spatially varying filter characteristic.

The approach may provide a particularly efficient and practical way of applying the spatially varying filter to provide spatially selective blurring of the rendered and extrapolated image content.

In the following, a specific example of this approach applied to a given viewport for a given desired rendering viewpoint will be described. Thus, an image is to be generated corresponding to the viewport for a viewer positioned at a position and with a view orientation as indicated by the rendering view vector. The approach of generating such an image will be described with reference to FIGS. 5-9 which show various examples of the images, viewports and masks generated as part of the process.

Figure 5:
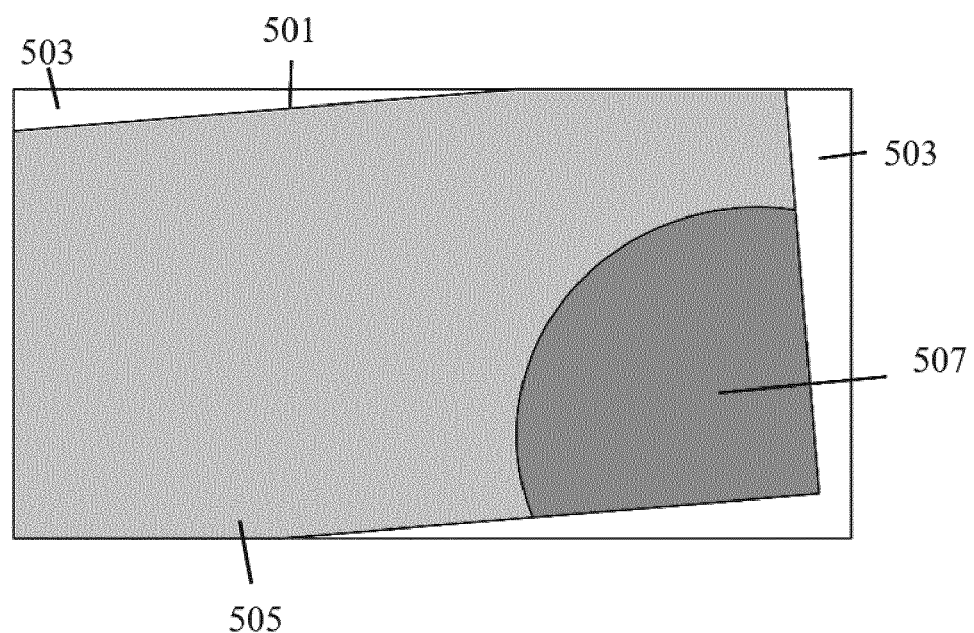
FIGS. 5-9 illustrate examples of images and masks generated by an exemplary image generating apparatus in accordance with some embodiments of the invention.

Initially, as shown in in FIG. 5 the renderer 301 may proceed to generate an initial image by rendering the parts of the image/viewport for which the 3D image data provides information. In the example, the resulting image comprises a first region 501 in which the renderer 301 is capable of rendering data from the 3D image data and a second region 503 in which no image content/data is generated by the renderer 301 due to the 3D image data not comprising data for this part of the viewport. It can be seen that the second region 503 comprises two distinct areas in the specific example. In the example, the view of the scene is for simplicity considered to consist of a homogenous background 505 with a darker circular area 507 in front (e.g. corresponding to the scene being a ball in front of a homogenous blue sky).

Figure 6:
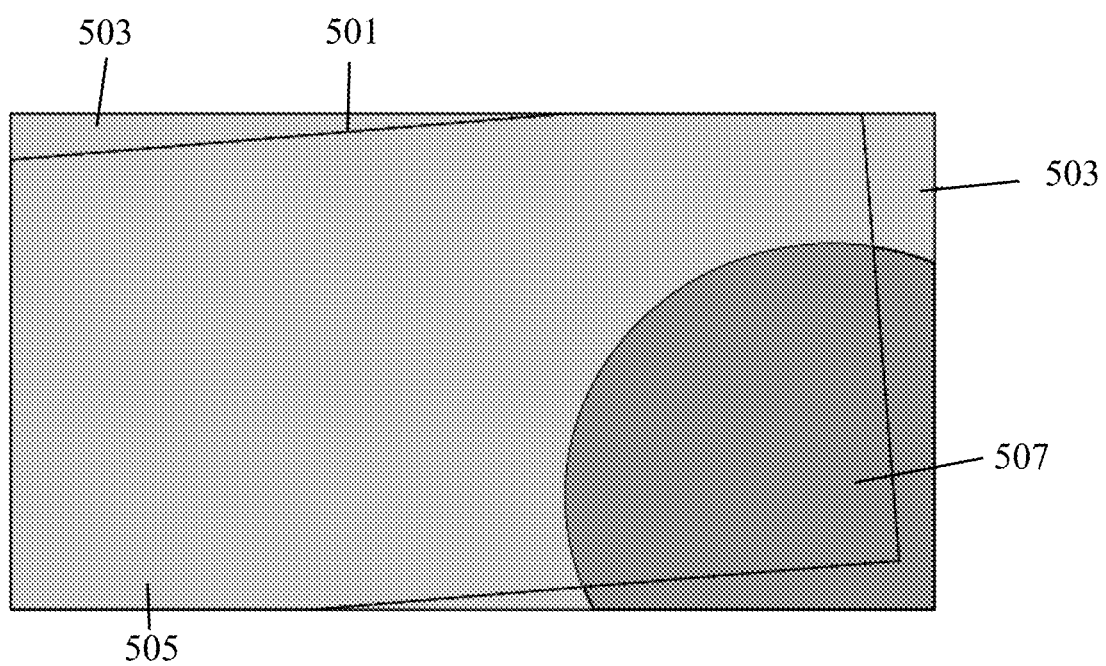

The extrapolator 303 may then extrapolate from the first region 501 into the second region 503 to generate a fully filled viewport/image as illustrated in FIG. 6.

Figure 7:
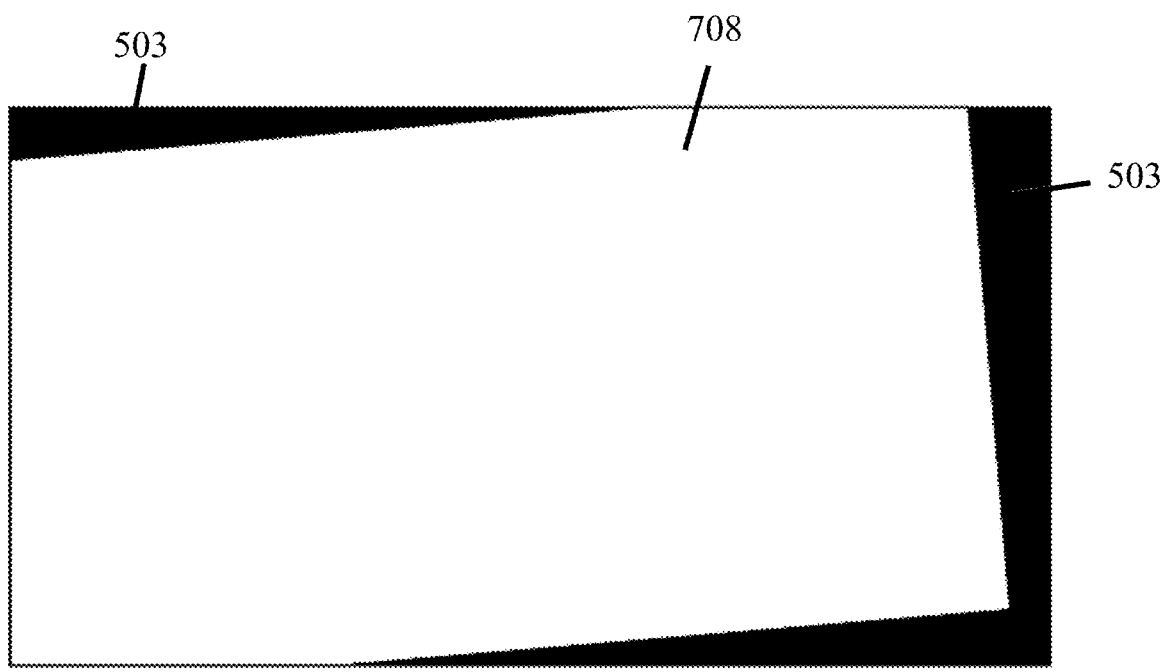
Figure 8:

The render region processor 401 may proceed to generate a rendering mask 708 indicative of the areas of the image/viewport for which the 3D image data provides data and for which it does not. Thus, the rendering mask 708 indicates where the renderer 301 has rendered image content and where the image content has been generated by the extrapolator 303. The rendering mask indicates the part of the image corresponding to the first region and the second region and the example for the specific case of FIG. 5 is illustrated in FIG. 7.

The rendering mask is fed to the filter adapter 403 which may proceed to generate a filtering characteristic from the rendering mask. Specifically, it may do so by low pass filtering the sharp binary mask of FIG. 7. An example of the result is provided in FIG. 8 where it can be seen that a transitional region 809 is generated comprising values that are intermediate between the value indicating that the renderer 301 has generated the image content and the value indicating that the extrapolator 303 has generated the image content. Thus, a gradual transition is provided in the transition region.

The filter adapter 403 may proceed to determine a low pass filter characteristic for the individual pixels based on the filtered rendering mask value. For example, a degree of low pass filtering may be determined as a function of the coefficient value, with the degree increasing the more the mask value is indicative of the pixel being determined by extrapolation. For example, the filtered coefficient values may directly be interpreted as a sigma map providing a scaled value of a sigma parameter value for a Gaussian low pass filter.

Thus, in this specific example, no filtering may be applied within the first region, a high degree of low pass filtering may be applied within second region, and intermediate filtering may be applied within the transitional region.

In some embodiments, more complex determination of the filter characteristic may be applied, such as for example adding a modification of the generated sigma value to reduce filtering in the second region.

Finally, the blur processor 305 may perform the spatial filtering using the determined filter characteristic. The filtering may be applied selectively, e.g. it may only be applied in the transitional region.

Figure 9:
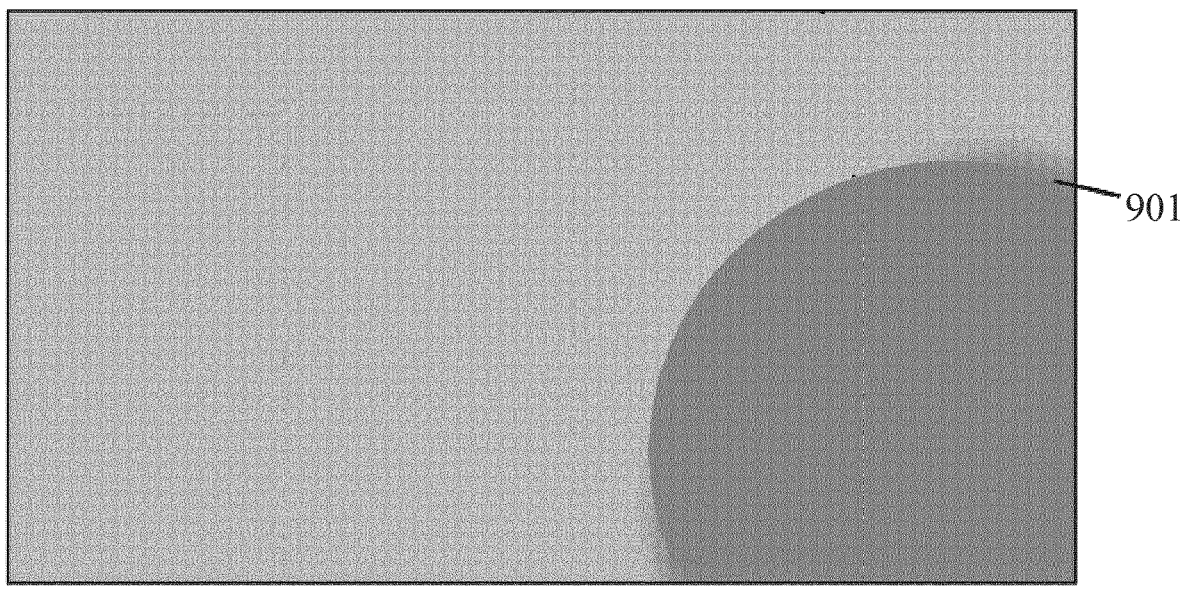

As a result of the process, an output such as that of FIG. 9 may be generated. The image comprises the combination of the rendered and extrapolated image content and thus provides a fully filled image/viewport, albeit with the extrapolated areas typically being of reduced quality/detail. Furthermore, as indicated by area 901, the different regions/areas are blended together As previously mentioned, any suitable approach for performing the extrapolation may be used without detracting from the invention.

For example, an approach similar to that of inpainting of occlusion areas may be used. Thus, as will be known to the skilled person, the extrapolation may for example use directional inpainting (copying of the color value from the nearest pixel), textured inpainting (extrapolating of textures on the edge between the first and second regions into the second region), and/or using a Poisson equation approach (inpainting based on an energy function).

In some scenarios, there may be image content just outside a viewport/image area which is still useful for the purpose of the extrapolation. Accordingly, counterintuitively the renderer 301 may in some embodiments render image areas that are (typically just) outside the determined viewport and the extrapolation may be in response to the rendered image content outside the viewport. For example, using directional inpainting, the pixel value for the pixel being extrapolated may be set to the value of the nearest pixel even if this is a pixel that is outside the viewport.

In some embodiments, the extrapolator 303 is arranged to determine a low pass filtered image property for a number of areas of the first region proximal to the second region. Specifically, for a number of areas that are close to the border between the first and the second region, the extrapolator 303 may determine the average (mean) color value. The extrapolator 303 may then proceed to set the pixel value for an area of the second region to match one or more of these color values.

For example, for each disjoint area of the second region, the extrapolator 303 may determine a color value as the average value of all the mean color values for the areas of the first region which border the disjoint area. In other embodiments, the first region may be divided into a plurality of subareas with each subarea comprising the pixels that are closest to a given area of the first region for which a mean value has been determined. The subarea of the second region may then be set to this mean value.

The approach may utilize a very low resolution processing. For example, each area of the first region and/or the second region may comprise no less than $10^3$, $10^4$, $10^5$, or $10^6$ pixels. Accordingly, the approach may result in the extrapolation into the second region generating a very coarse representation of the scene which typically may essentially correspond to a reflection of an average color value. However, this may in many scenarios provide an acceptable perception and may provide a low complexity approach.

In some embodiments, the extrapolation may be based on a bilateral filtering of a downscaled version of the image generated by the renderer 301. Specifically, the extrapolator 303 may be arranged to first downscale the image. Typically, the downscaling may be significant and generate a filter image that has a resolution which does not exceed e.g. $10^4$, $10^5$, or $10^6$ pixels. The bilateral filter may then be applied to this downscaled image with the bilateral filter being guided by the rendering mask (e.g. the original binary or the filtered rendering mask). Thus, the weights of the spatial filtering are dependent on the rendering mask value, and thus on whether the weight is for a pixel that belongs to the first region or to the second region. Pixels that belong to the first region will typically be weighted higher with pixels belonging to the second region having lower weights (in many embodiments zero weights). The weights may further typically depend on the distance between the pixel for which the weight is determined and the pixel for which the filtered value is currently determined.

The resulting filtered downscaled image is then upscaled to the original resolution and subsequently combined with the image from the renderer 301. Specifically, for pixels in the first region, the pixel value of the unfiltered image may be selected and for pixels in the second region, pixel values in the bilaterally filtered image may be selected.

The approach may in many scenarios provide an improved extrapolation. A particular benefit is that the extrapolation is already suitably blurred due to the upscaling operation In some embodiments, the image data receiver 101 may be arranged to receive the 3D image data in a data stream. For example, the data may be received in a data stream from a remote source. e.g. via a network, such as specifically the Internet. As another example, the data stream may be received from a local source, such as from a Blu-ray Disc reader.

In such examples, the data stream may comprise metadata which may include extrapolation control data and the extrapolator 303 may be arranged to perform the extrapolation in response to the extrapolation control data.

For example, the extrapolator 303 may be capable of performing different extrapolation algorithms, such as e.g. a detailed texture inpainting, or a low color mean color approach. The 3D image data may be received in a data stream which also comprises extrapolation control data that defines which of these should be used.

The approach may allow a source of the 3D image data to control some aspects of the behavior of the receiving end when rendering images, and thus may provide additional control over the user experience to an originator of the 3D image data. For example, a standardized approach can be used which may support the use of a well-defined extrapolation that matches with the intent of the director by adding suitable metadata, which may include e.g.:

Metadata to select a (predefined) extrapolation algorithm.
Metadata to select parameters of a predefined extrapolation algorithm.

As a specific example, metadata may be provided which describes an extrapolator, for instance a DASH XML URL referring to another URL with a shader model 4 file, with that extrapolator having as input a downscaled version of the rendered viewport and a render mask or the color key that encodes the render mask.

In some embodiments, the image generating apparatus of FIG. 1 may further comprise a filter processor which is arranged to apply an adaptive spatial filter to the image (typically) after this has been generated by the image generator 105. In such examples, the spatial filter may be a global filter which is applied to the entire image and which has the same properties for the entire image, i.e. the properties are spatially invariant.

However, the spatial filter may have a property which is dependent on how much of the viewpoint/image can be rendered based on the 3D image data, i.e. the property of the global spatial filter may be dependent on the proportion of the viewpoint for which the 3D image does not comprise image data. This proportion may be determined as a ratio between the area of the first region and the area of the second region.

Specifically, the filter may have an increasing strength when the proportion of the image which is covered by second region increases. For example, for situations where the renderer 301 can generate the entire image content, the filter effect may be insignificant (or indeed there may be no filtering). However, as the proportion of the image that needs to be filled by extrapolation increases, the filtering effect may be gradually increased, and may result in a significant perceptual effect.

Thus, in some embodiments, a global image filter may be applied when a substantial part of the image/viewport is without content generated directly from the 3D image data. The strength of the filter may be gradually varied up or down according to how much extrapolated content is in the image/viewport.

Examples of suitable image filters include:
Saturation reduction
Contrast reduction
Brightness reduction
Spatial low-pass filter
Overlay of another scene such as a holodeck or perimeter fence
Combinations of the above The approach may allow a further perceptual effect which may affect the perceived view towards more extreme directions, and may assist in biasing viewer behavior away from areas for which the 3D image data does not provide direct information.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An apparatus for generating an image, the apparatus comprising:
   a first receiver circuit, wherein the first receiver circuit is arranged to receive 3D image data for a scene, wherein the 3D image data provides an incomplete representation of the scene;
   a second receiver circuit, wherein the second receiver circuit is arranged to receive a target view vector, wherein the target view vector is indicative of a target viewpoint in the scene;
   a reference source, wherein the reference source is arranged to provide a reference view vector,
   wherein the reference view vector is indicative of a reference viewpoint for the scene,
   wherein the reference view vector is determined in response to a border view vector,
   wherein the border view vector is indicative of a border between a part of the scene for which the 3D image data comprises data describing visual properties of the scene and a part of the scene for which the 3D image data does not comprise data describing the visual properties of the scene,
   wherein the reference view vector is set at the border view vector or relative to the border view vector;
   a modifier circuit, wherein the modifier circuit is arranged to generate a rendering view vector,
   wherein the reference view vector is indicative of a rendering viewpoint as a function of the target viewpoint and the reference viewpoint for the scene,
   wherein the modifier circuit is arranged to bias the rendering view vector toward the reference view vector for at least some values of the target view vector, setting the rendering viewpoint relative to the reference view vector, when the target view vector is directed to the part of the scene for which the 3D image data does not comprise data describing the visual properties of the scene; and
   an image generator circuit, wherein the image generator circuit is arranged to generate the image using the rendering view vector and the 3D image data.

2. The apparatus of claim 1,
   wherein the first receiver circuit is arranged to receive a data stream,
   wherein the data stream comprises the 3D image data and nominal viewpoint data,
   wherein the reference source is arranged to generate the reference view vector in response to the nominal viewpoint data.

3. The apparatus of claim 1, further comprising a third receiver circuit, wherein the third receiver circuit is arranged to receive display property data, wherein the reference source is arranged to generate the reference view vector in response to the display property data.

4. The apparatus of claim 1, wherein the modifier circuit is arranged to determine the rendering view vector in response to a proportion of a viewport for which the 3D image data comprises image data for a viewpoint corresponding to the rendering view vector.

5. The apparatus of claim 1,
   wherein the 3D image data comprises 3D image data representing views from a set of viewpoints,
   wherein the modifier circuit is arranged to determine the rendering view vector in response to the set of viewpoints.

6. The apparatus of claim 1, wherein the modifier circuit is arranged to increase a distance from the rendering view vector to the target view vector for an increasing distance from the target view vector to the reference view vector.

7. The apparatus of claim 1, wherein the modifier circuit is arranged to increase a distance from the rendering view vector to the target view vector for a decreasing distance from the target view vector to the reference view vector.

8. The apparatus of claim 1, wherein the modifier circuit is arranged to decrease a ratio between a distance from the rendering view vector to the reference view vector and a distance from the rendering view vector to the target view vector for an increasing distance from the target view vector to the reference view vector.

9. The apparatus of claim 1, wherein the modifier circuit is arranged to determine the rendering view vector as substantially the target view vector for a difference between the target view vector and the reference view vector when the reference view vector is below a threshold.

10. The apparatus of claim 1, wherein the image generator circuit comprises:
    a renderer circuit, wherein the renderer circuit is arranged to render a first region of the image for the rendering view vector, wherein the first region is the part of the scene for which the 3D image data comprises image data; and
    an extrapolator circuit, wherein the extrapolator circuit is arranged to extrapolate the 3D image data into a second region of the image,
    wherein the second region is the part of the scene for which the 3D image data does not comprise data describing the visual properties of the scene, and
    wherein the first region and the second region are adjoining regions.

11. The apparatus claim 10, wherein the image generator circuit further comprises a blur processor circuit,
    wherein the blur processor circuit applies a spatially varying blurring to the image,
    wherein a degree of blurring is higher in a transitional region between the first region and the second region than for an internal area of the first region.

12. The apparatus of claim 11, wherein the transitional region includes a portion of the first region.

13. A method of generating an image, comprising:
    receiving a target view vector, wherein the target view vector is indicative of a target viewpoint in the scene for the image;
    providing a reference view vector,
    wherein the reference view vector is indicative of a reference viewpoint for the scene,
    wherein the reference view vector is determined in response to a border view vector indicating a border between a part of the scene for which the 3D image data comprises describing visual properties of the scene and a part of the scene for which 3D image data does not comprise data describing the visual properties of the scene,
    wherein the reference view vector is set at the border view vector or relative to the border view vector;
    generating a rendering view vector,
    wherein the rendering view vector is indicative of a rendering viewpoint as a function of the target viewpoint and the reference viewpoint for the scene, wherein the generation comprises biasing the rendering view vector toward the reference view vector for at least some values of the target view vector, setting the rendering viewpoint relative to the reference view vector, when the target view vector is directed to the part of the scene for which the 3D image data does not comprise data describing the visual properties of the scene; and generating the image using the rendering view vector and the 3D image data.

14. The method of claim 13 further comprising:

receiving a data stream, wherein the data stream comprises the 3D image data and nominal viewpoint data; and generating the reference view vector in response to the nominal viewpoint data.

15. The method of claim 13 further comprising:

receiving display property data, wherein a reference source is arranged to generate the reference view vector in response to the display property data.

16. The method of claim 13 further comprising:

determining the rendering view vector in response to a proportion of a viewport for which the 3D image data comprises image data for a viewpoint corresponding to the rendering view vector.

17. The method of claim 13, wherein the 3D image data comprises 3D image data representing views from a set of viewpoints, the method further comprising determining the rendering view vector in response to the set of viewpoints.

18. The method of claim 13 further comprising:

increasing a distance from the rendering view vector to the target view vector for an increasing distance from the target view vector to the reference view vector.

19. The method of claim 13 further comprising:

increasing a distance from the rendering view vector to the target view vector for a decreasing distance from the target view vector to the reference view vector.

20. A non-transitory computer readable medium storing instructions for generating an image that, when executed by one or more processors, cause the one or more processors to:

receive 3D image data for a scene, wherein the 3D image data provides an incomplete representation of the scene;

receive a target view vector, wherein the target view vector is indicative of a target viewpoint in the scene form the image;

provide a reference view vector, wherein the reference view vector is indicative of a reference viewpoint for the scene, wherein the reference view vector is determined in response to a border view vector indicating a border between a part of the scene for which the 3D image data comprises data describing visual properties of the scene and a part of the scene for which the 3D image data does not comprise data describing the visual properties of the scene, wherein the reference view vector is set at the border view vector or relative to the border view vector;

generate a rendering view vector, wherein the rendering view vector is indicative of a rendering viewpoint as a function of the target viewpoint and the reference viewpoint for the scene, wherein the generation comprises biasing the rendering view vector toward the reference view vector for at least some values of the target view vector, setting the rendering viewpoint relative to the reference view vector, when the target view vector is directed to the part of the scene for which the 3D image data does not comprise data describing the visual properties of the scene; and generate the image using the rendering view vector and the 3D image data.

\* \* \* \* \*